United States Patent
Pinarbasi (10) Patent No.: US 6,700,755 B2
(45) Date of Patent: *Mar. 2, 2004

(54) SPIN VALVE SENSOR WITH MODIFIED MAGNETOSTRICTION

(75) Inventor: Mustafa Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 426 days.

This patent is subject to a terminal disclaimer.

(21) Appl. No.: 09/873,071

(22) Filed: May 31, 2001

(65) Prior Publication Data

US 2002/0181169 A1 Dec. 5, 2002

(51) Int. Cl.$^7$ .............................. G11B 5/39; G11B 5/127
(52) U.S. Cl. ................... 360/324.11; 29/603.14
(58) Field of Search .................. 360/324.11, 324.1; 29/603.07, 603.14

(56) References Cited

U.S. PATENT DOCUMENTS

| 4,663,607 A | | 5/1987 | Kitada et al. ............. 338/32 H |
| 5,465,185 A | * | 11/1995 | Heim et al. ............. 360/324.11 |
| 5,633,092 A | | 5/1997 | Gibbs ........................ 428/611 |
| 5,673,162 A | | 9/1997 | Saito .......................... 360/113 |
| 6,052,262 A | | 4/2000 | Kamiguchi et al. ......... 360/113 |
| 6,226,159 B1 | * | 5/2001 | Pinarbasi ............... 360/324.11 |
| 2001/0006445 A1 | * | 7/2001 | Pinarbasi ............... 360/324.11 |

FOREIGN PATENT DOCUMENTS

| JP | 10302227 | 11/1998 | ............. G11B/5/39 |
| JP | 11354860 | 12/1999 | ........... H01L/43/08 |

* cited by examiner

Primary Examiner—George J. Letscher
(74) Attorney, Agent, or Firm—Ervin F. Johnston (57) ABSTRACT

A spin valve sensor has a pinned layer structure which includes first, second and third pinned films wherein the first pinned film is nickel iron and is located between the second and third pinned films which are cobalt iron. This structure significantly reduces the magnetostriction of the free layer structure of the spin valve sensor to an acceptable level.

34 Claims, 8 Drawing Sheets

FIG. 9
(ABS)

SPIN VALVE SENSOR WITH MODIFIED MAGNETOSTRICTION

BACKGROUND OF THE INVENTION

1. Field of the Invention

The present invention relates to a spin valve sensor with a modified magnetostriction and, more particularly, to a spin valve sensor wherein the magnetostriction of the free layer structure is modified by a unique construction of a pinned layer structure.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current but without signal fields from the magnetic disk.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The transfer curve of a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

Another factor that can affect readback asymmetry is positive magnetostriction of the free layer structure. If the free layer structure has positive magnetostriction and is subjected to compressive stress, there will be a stress-induced anisotropy that urges the magnetic moment of the free layer from the aforementioned position parallel to the ABS toward a position perpendicular to the ABS. The result is readback asymmetry. The compressive stress occurs after the magnetic head is lapped at the ABS to form the stripe height of the sensor of the read head. After lapping, the free layer is in compression and this, in combination with positive magnetostriction, causes the aforementioned readback asymmetry. It is interesting to note that if the free layer structure has negative magnetostriction in combination with compressive stress that the magnetic moment of the free layer is strengthened along the position parallel to the ABS. A high negative magnetostriction, however, is not desirable because it makes the magnetic moment of the free layer structure stiff and less responsive to field signals from the rotating magnetic disk. Accordingly, it is desirable that the magnetostriction of the free layer be zero or only slightly negative.

Unfortunately, magnetostriction of the free layer is difficult to control in present sputtering deposition systems. A typical free layer structure includes first and second free layers wherein the first free layer is cobalt iron and the second free layer is nickel iron with the first free layer interfacing the copper spacer layer for increasing the magnetoresistive coefficient dr/R of the sensor. Typical compositions of the free layers are cobalt iron ($Co_{90}Fe_{10}$) for the first free layer and nickel iron ($Ni_{83}Fe_{17}$) for the second free layer. When these layers are formed by sputter deposition the free layer structure invariably has an undesirable positive magnetostriction. In the past, the positive magnetostriction of the free layers has been accomplished by changing the composition of the free layers, such as reducing the iron content in the nickel iron and/or reducing the iron content in the cobalt iron. Since there is typically more than one nickel iron and cobalt iron layer in the spin valve sensor, this means that the targets in the sensor have to be changed in order to change the composition and lower the magnetostriction of the free layer structure.

SUMMARY OF THE INVENTION

The present invention provides a pinned layer structure and a method of construction thereof which provides the free layer structure with a desired magnetostriction without changing the target composition of the free layer structure within an ion beam sputtering system. This is accomplished by providing the pinned layer structure with ferromagnetic first, second and third pinned films wherein the second and third pinned films are composed of cobalt iron and the first pinned film is composed of nickel iron. The first pinned film is located between the second and third pinned films and the third film interfaces the copper spacer layer. In examples where the nickel iron first pinned film was 4 Å, 6 Å and 8 Å the magnetostriction was −0.7, −0.4 and −0.28, respectively. In a preferred embodiment, the pinned layer structure is an antiparallel (AP) pinned layer structure where an antiparallel coupling layer is located between first and second antiparallel (AP) pinned layers. By strong antiparallel coupling between the first and second AP pinned layers their magnetic moments are antiparallel. The second AP pinned layer of this structure provides the aforementioned first, second and third pinned films. The AP pinned layer structure exerts a small net demagnetizing field ($H_D$) on the free layer structure and is fully described in commonly assigned U.S. Pat. No. 5,465,185 which is incorporated by reference herein.

An object of the present invention is to provide a pinned layer structure which provides a free layer structure with an acceptable magnetostriction.

Another object is that for a given composition of a free layer structure that an acceptable magnetostriction of the free layer structure can be obtained by modifying the pinned layer structure.

A further object is to provide a pinned layer structure which enables multiple cobalt iron layers of a spin valve sensor to be fabricated in a sputtering chamber with a single cobalt iron target and/or multiple nickel iron layers to be fabricated with a single nickel iron target while obtaining a desirable magnetostriction of a free layer structure.

A further object is to provide a method of making the aforementioned spin valve sensors.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
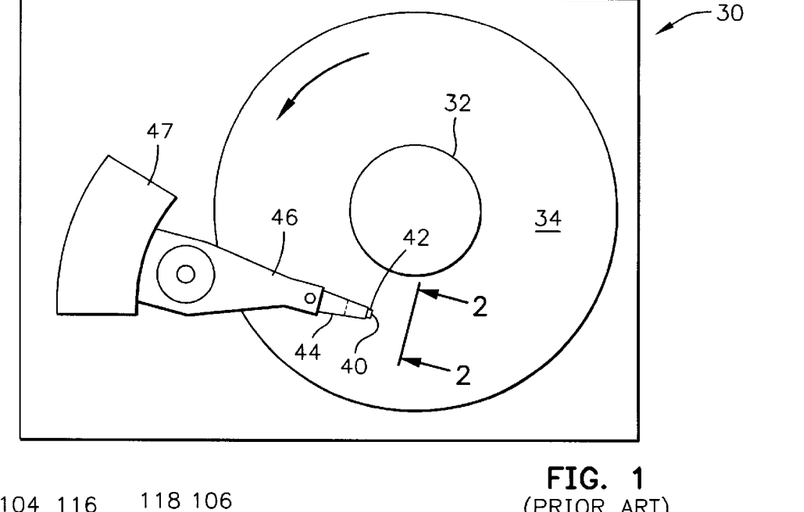
FIG. 1 is a plan view of an exemplary magnetic disk drive.
Figure 2:
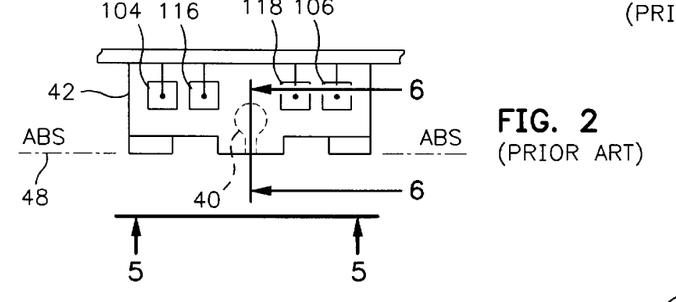
FIG. 2 is an end view of a slider with a magnetic head of the disk drive as seen in plane 2—2 of FIG. 1.
Figure 3:
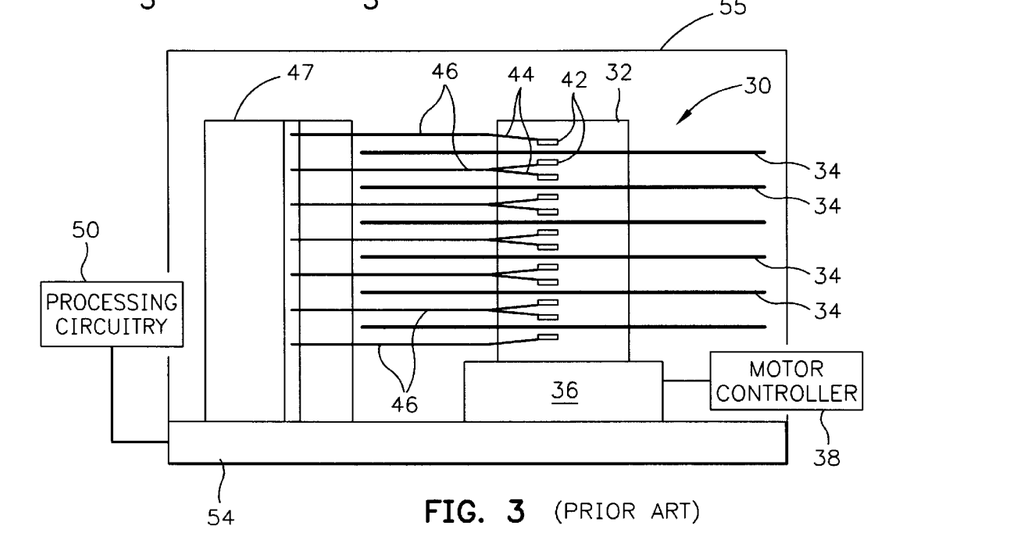
FIG. 3 is an elevation view of the magnetic disk drive wherein multiple disks and magnetic heads are employed.
Figure 4:
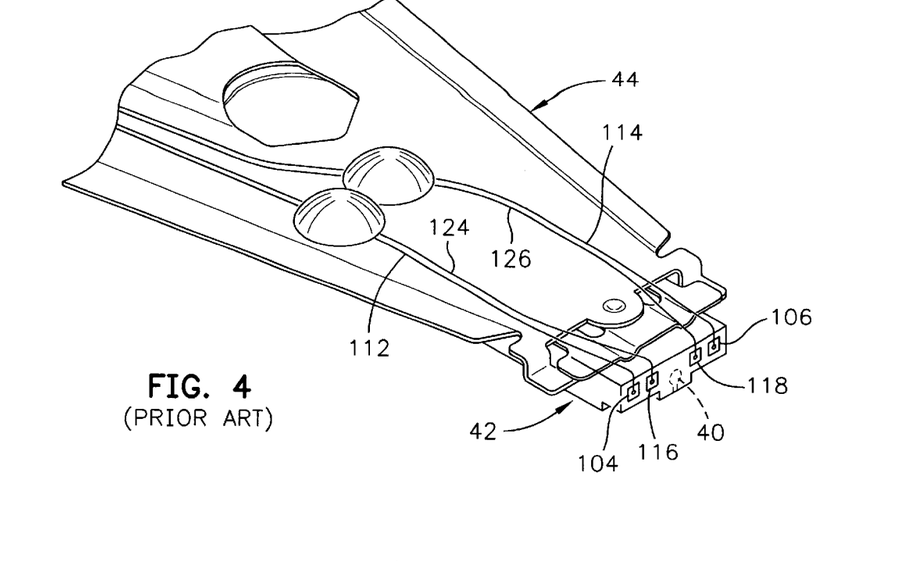
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
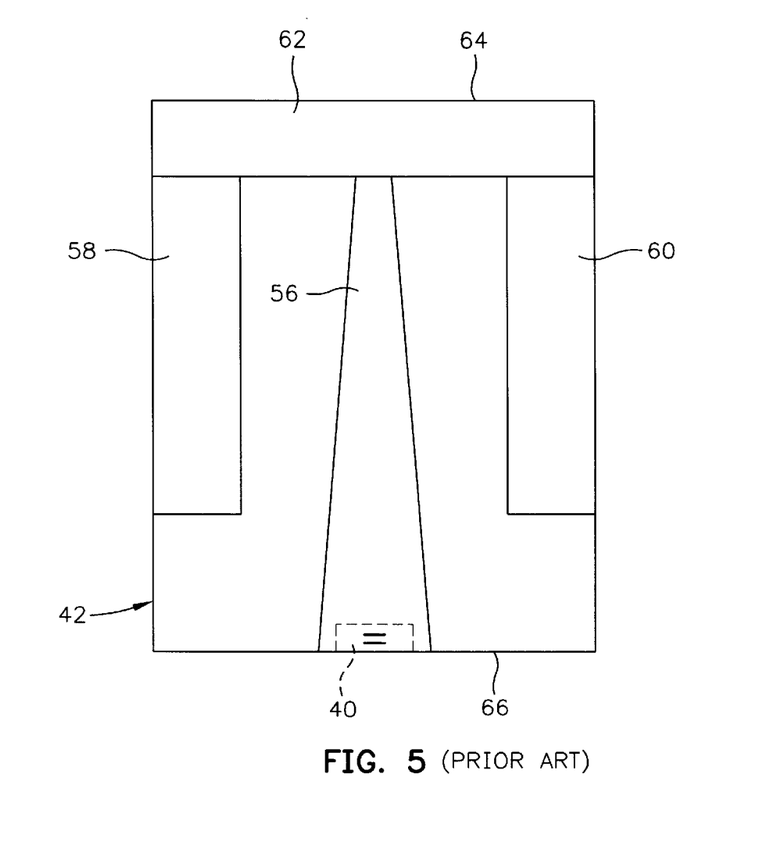
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
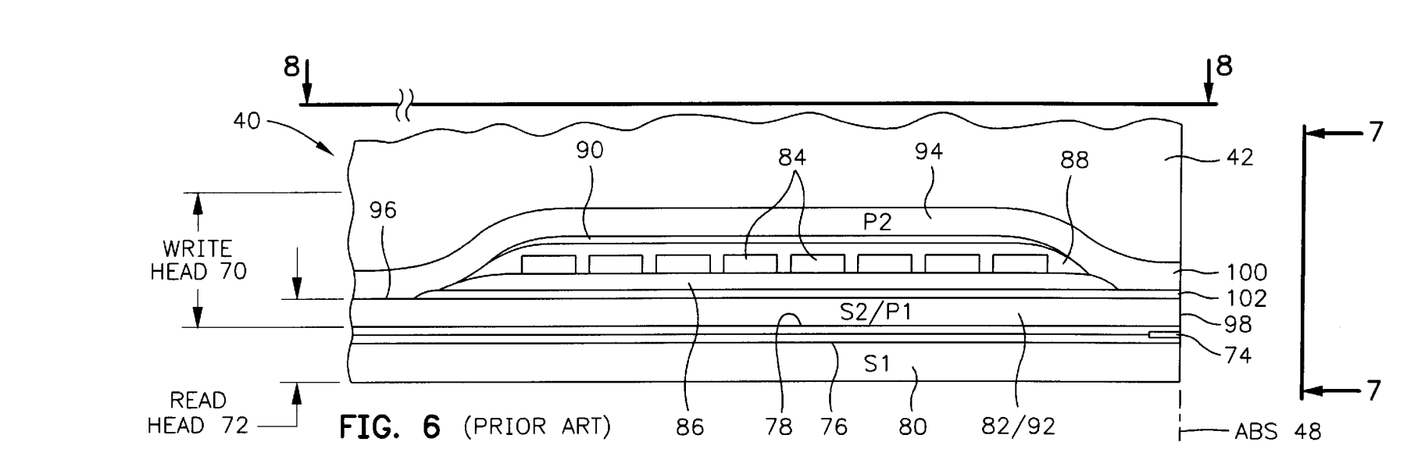
FIG. 6 is a partial view of the slider and a merged magnetic head as seen in plane 6—6 of FIG. 2.
Figure 7:
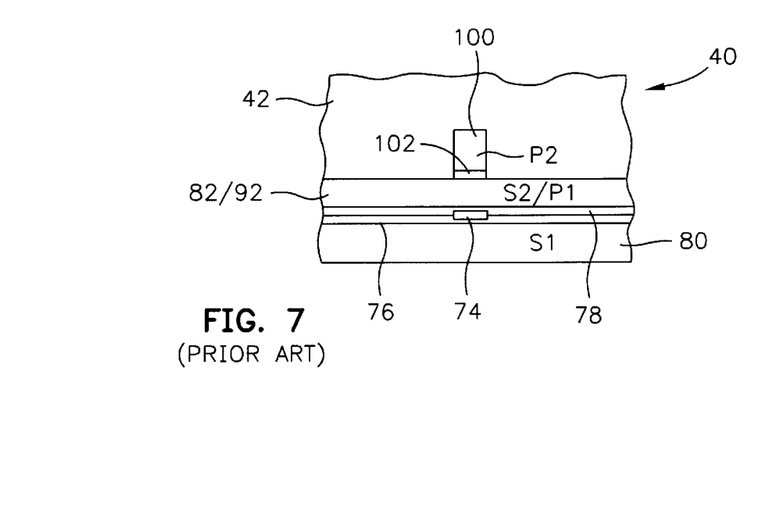
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 8:
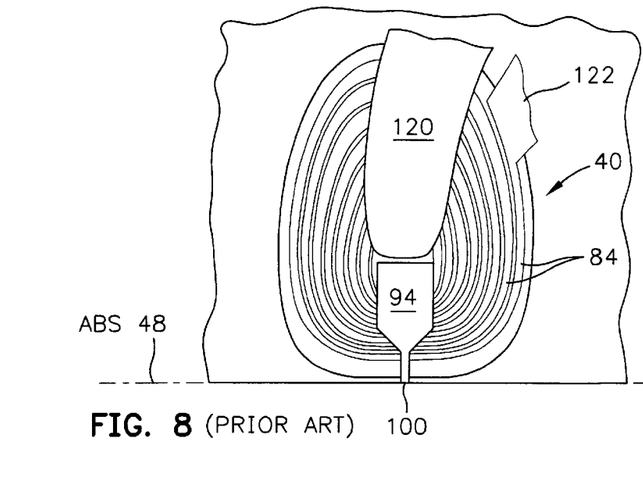
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head an insulation layer is located between a second shield layer and a first pole piece layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
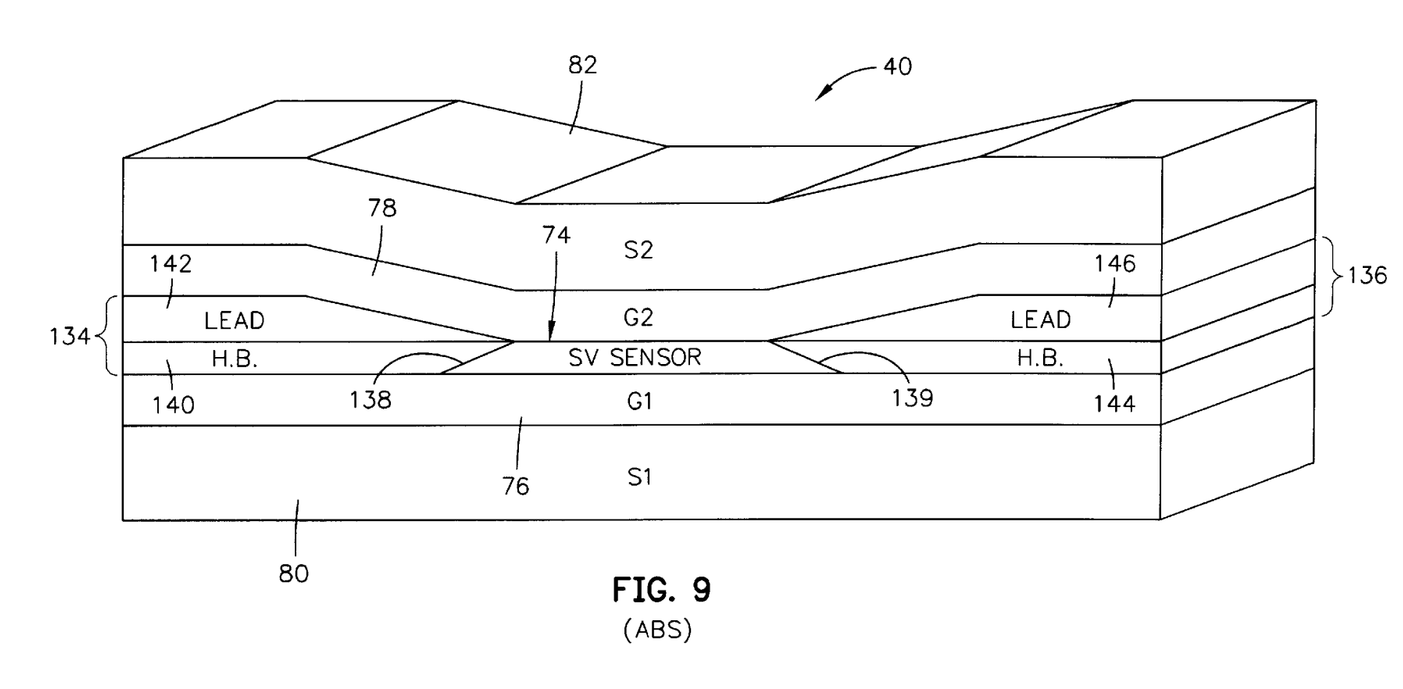
FIG. 9 is an enlarged isometric illustration of the read head with a spin valve sensor.

FIG. 9 is an enlarged isometric ABS illustration of the read head 40 shown in FIG. 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 10:
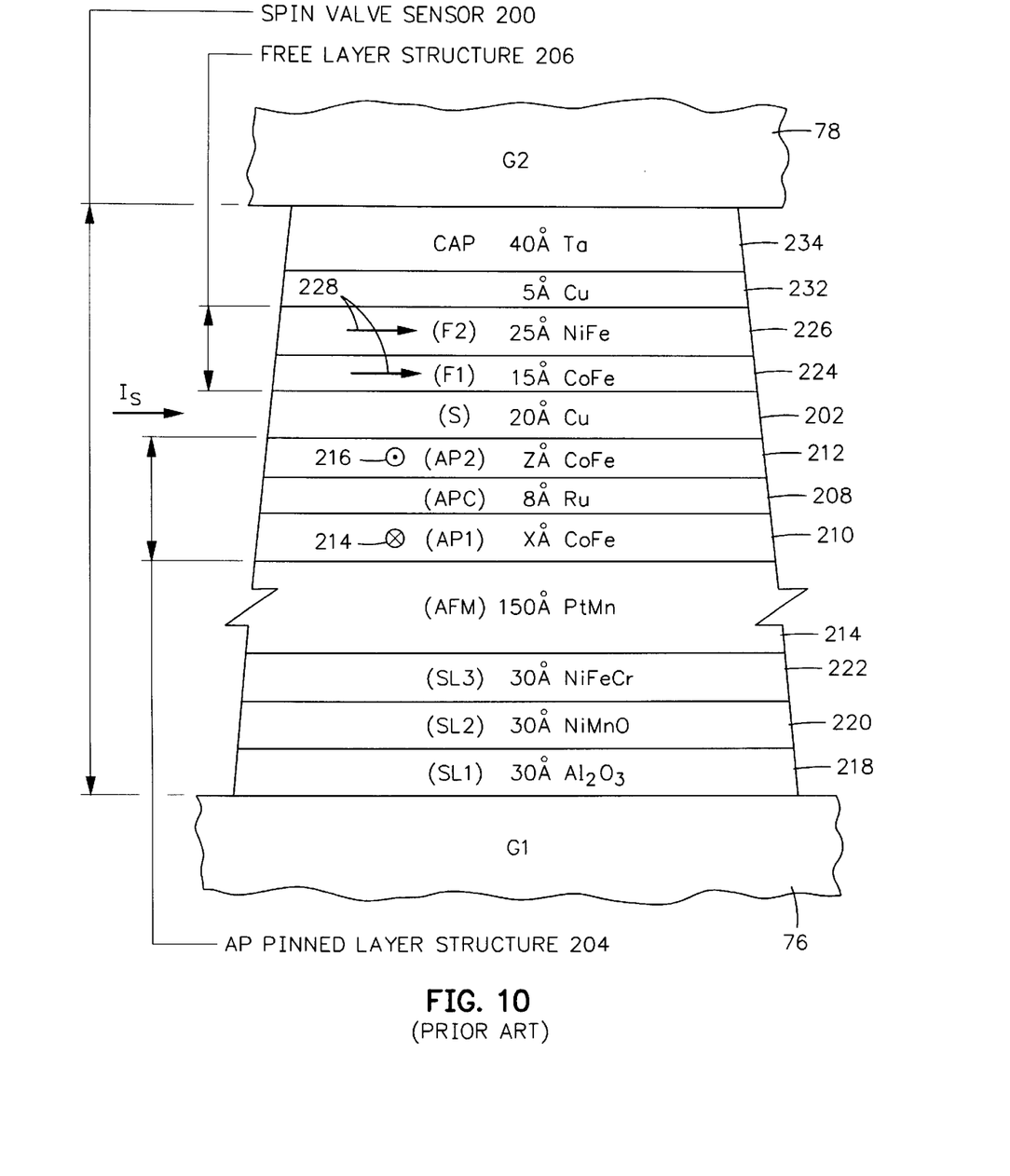
FIG. 10 is an ABS illustration of a first example of a first prior art spin valve sensor.

FIG. 10 shows an ABS illustration of a prior art spin valve sensor 200 which is located between the first and second read gap layers 76 and 78. The spin valve sensor 200 includes a spacer (S) layer 202 which is located between an antiparallel (AP) pinned layer structure 204 and a free layer structure 206. The AP pinned layer structure includes an antiparallel coupling (APC) layer 208 which is located between first and second AP pinned layers (AP1) and (AP2) 210 and 212. The first AP pinned layer 210 is exchange coupled to an antiferromagnetic (AFM) pinning layer 214 which pins a magnetic moment 214 of the first AP pinned layer perpendicular to the ABS in a direction out of the sensor or into the sensor, as shown in FIG. 10. By strong antiparallel coupling between the first and second AP pinned layers a magnetic moment 216 of the second AP pinned layer is antiparallel to the magnetic moment 214. First, second and third seed layers (SL1), (SL2) and (SL3) 218, 220 and 222 may be provided between the first read gap layer 76 and the pinning layer 214 for promoting a desirable texture of the layers deposited thereon.

The free layer structure 206 includes first and second free layers (F1) and (F2) 224 and 226 with the first free layer interfacing the spacer layer 202. The free layer structure has a magnetic moment 228 which is oriented parallel to the ABS and to the major planes of the layers in a direction from right to left or from left to right, as shown in FIG. 10. A copper layer 232 may be located on the second free layer 226 for reflecting conduction electrons back into the mean free path of conduction electrons and a cap layer 234 may be located on the layer 232 for protecting the spin valve sensor from subsequent processing steps.

When a signal field from the rotating magnetic disk rotates the magnetic moment 228 into the sensor the magnetic moments 228 and 216 become more antiparallel which increases the resistance of the sensor to the sense current ($I_S$) and when a signal field rotates the magnetic moment 228 of the free layer structure the magnetic moments 228 and 216 become more parallel which reduces the resistance of the sensor to the sense current ($I_s$). These resistance changes are processed as playback signals by the processing circuitry 50 in FIG. 3.

The thicknesses and materials of the layers were 30 Å of aluminum oxide for the layer 218, 30 Å of nickel manganese oxide for the layer 220, 30 Å of nickel iron chromium for the layer 222, 150 Å of platinum manganese for the layer 214, various thicknesses X of cobalt iron ($Co_{90}Fe_{10}$) for the layer 210, 8 Å of ruthenium for the layer 208, various thicknesses Z of cobalt iron ($Co_{90}Fe_{10}$) for the layer 212, 20 Å of copper for the layer 202, 15 Å of cobalt iron ($Co_{90}Fe_{10}$) for the layer 224, 25 Å of nickel iron ($Ni_{83}Fe_{17}$) for the layer 226, 5 Å of copper for the layer 232 and 40 Å of tantalum for the layer 234.

EXAMPLE 1

Prior Art

In this example, the sensor 200 in FIG. 10 was tested with the thickness X of the first AP pinned layer 210 being 13 Å and the thickness Z of the second AP pinned layer 212 being 17 Å. The magnetostriction in this example was $14.9 \times 10^{-7}$. The resistance R of the sensor was 24.5 ohms, the magnetoresistive coefficient dr/R was 8.7%, the easy axis coercivity ($H_C$) was 5 Oe and the ferromagnetic coupling field ($H_F$) was 3 Oe.

EXAMPLE 2

The prior art head in FIG. 10 was tested with the thickness X of the first AP pinned layer 210 being 13 Å and with the thickness Z of the second AP pinned layer 212 being 20 Å. The magnetostriction was $16.2 \times 10^{-7}$. The resistance R was 22.3 ohms, the magnetoresistive coefficient dr/R was 8.8%, the easy axis coercivity ($H_C$) was 5 Oe and the ferromagnetic coupling field ($H_F$) was 2 Oe.

EXAMPLE 3

The prior art head in FIG. 10 was again tested with the thickness X of the first AP pinned layer 210 being 17 Å and the thickness Z of the second AP pinned layer 212 being 26 Å. The magnetostriction was $9.6 \times 10^{-7}$. The resistance R was 20.5 ohms, the magnetoresistive coefficient dr/R was 9.4%, the easy axis coercivity ($H_C$) was 4.5 Oe and the ferromagnetic coupling field ($H_F$) was 17 Oe.

EXAMPLE 4

The Invention

Figure 11:
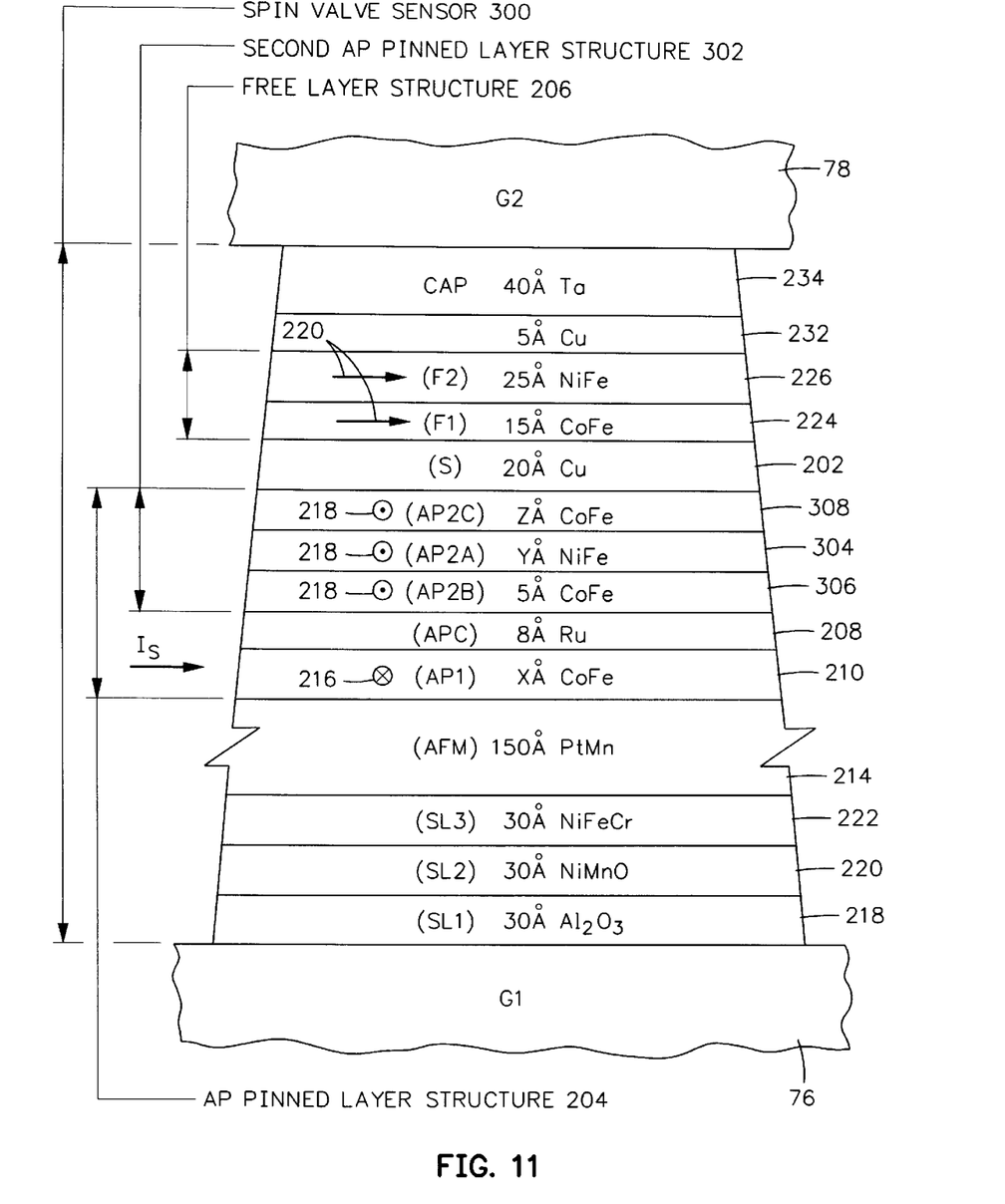
FIG. 11 is an ABS illustration of a first embodiment of the present invention.

The spin valve sensor 300 shown in FIG. 11, which incorporates the present invention, was tested. The spin valve sensor 300 is the same as the spin valve sensor 200 in FIG. 10 except a second AP pinned layer structure 302 includes first, second and third AP pinned films (AP2A), (AP2B) and (AP2C) 304, 306 and 308 with the first pinned film 304 being located between the second and third pinned films 306 and 308. In this example, the thickness and material of the first pinned film 304 was 4 Å of nickel iron ($Ni_{83}Fe_{17}$), the thickness and material of the second pinned film 306 was 5 Å of cobalt iron ($Co_{90}Fe_{10}$), and the thickness and material of the third pinned film 308 was 16 Å of cobalt iron ($Co_{90}Fe_{10}$). The thickness of the first AP pinned layer 210 was 13 Å. The magnetostriction of this example was $-0.7 \times 10^{-7}$. The resistance R was 22.8 ohms, the magnetoresistive coefficient dr/R was 9.0%, the easy axis coercivity ($H_C$) was 5 Oe and the ferromagnetic coupling field ($H_F$) was -9.6 Oe.

EXAMPLE 5

The Invention

Example 5 was the same as Example 4 except the thickness of the nickel iron first pinned film 304 was 6 Å and the thickness of the third pinned film 308 was 14 Å. The magnetostriction was $-1.4 \times 10^{-7}$. The resistance R was 22.9 ohms, the magnetoresistive coefficient dr/R was 8.94%, the easy axis coercivity ($H_C$) was 4.5 Oe and the ferromagnetic coupling field ($H_F$) was -7.0 Oe.

EXAMPLE 6

The Invention

This example was the same as Examples 4 and 5 except the thickness of the nickel iron first pinned film 304 was 8 Å and the thickness of the third pinned film 308 was 12 Å. The magnetostriction was $-0.28 \times 10^{-7}$. The resistance R was 22.5 ohms, the magnetoresistive coefficient dr/R was 9.12%, the easy axis coercivity ($H_C$) was 4.0 Oe and the ferromagnetic coupling field ($H_F$) was 0.

EXAMPLE 7

Prior Art

Figure 12:
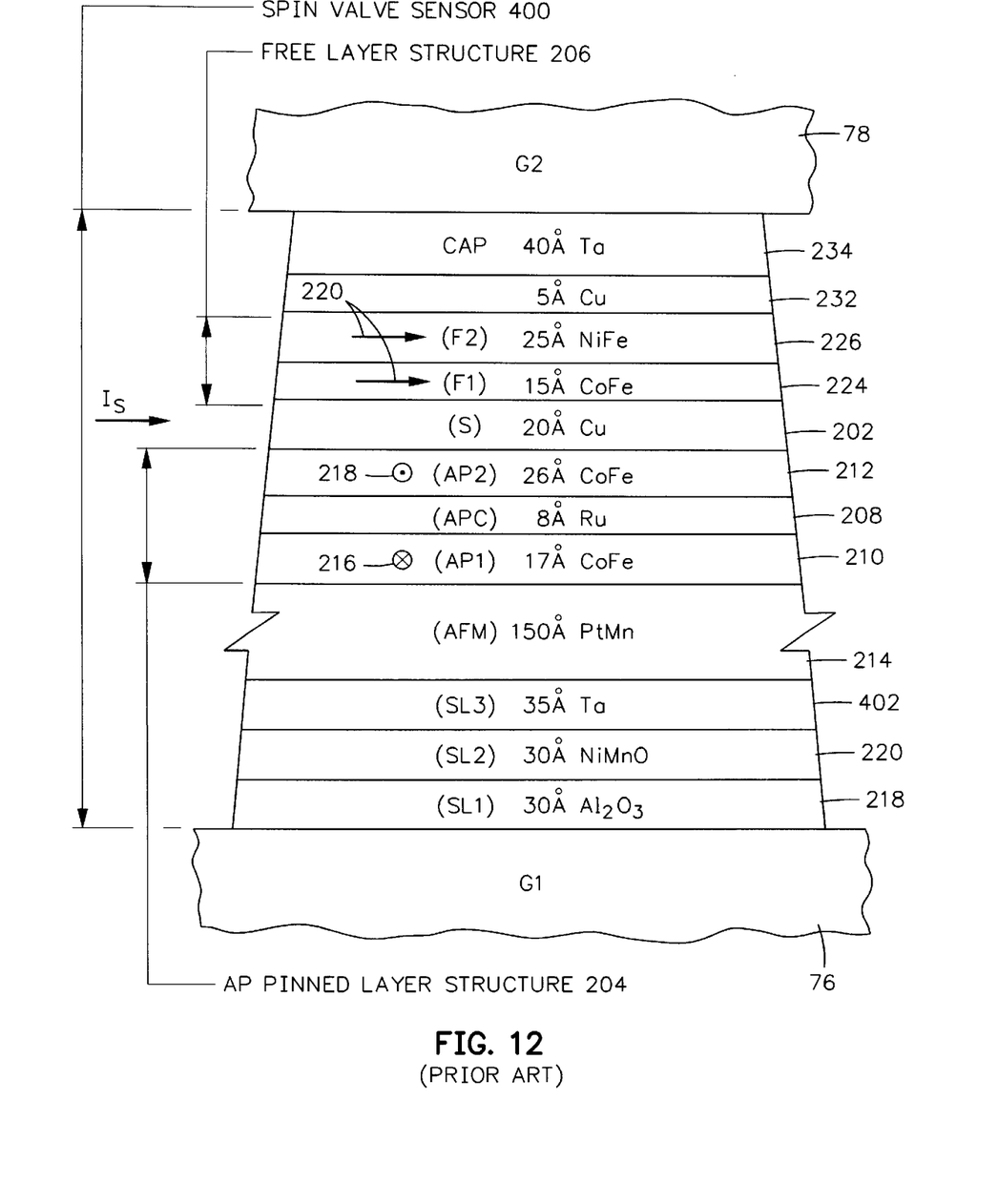
FIG. 12 is an ABS illustration of a second example of a prior art spin valve sensor.

The spin valve sensor 400 in FIG. 12 is the same as the spin valve sensor 200 in FIG. 10 except 35 Å of tantalum was employed for the third seed layer 402, the thickness of the cobalt iron first AP pinned layer 210 was 17 Å and the thickness of the cobalt iron second AP pinned layer 230 was 26 Å. The magnetostriction of this example was $10 \times 10^{-7}$. The resistance R was 23.6 ohms, the magnetoresistive coefficient dr/R was 8.66%, the easy axis coercivity ($H_C$) was 6 Oe and the ferromagnetic coupling field ($H_F$) was -11 Oe.

EXAMPLE 8

The Invention

Figure 13:
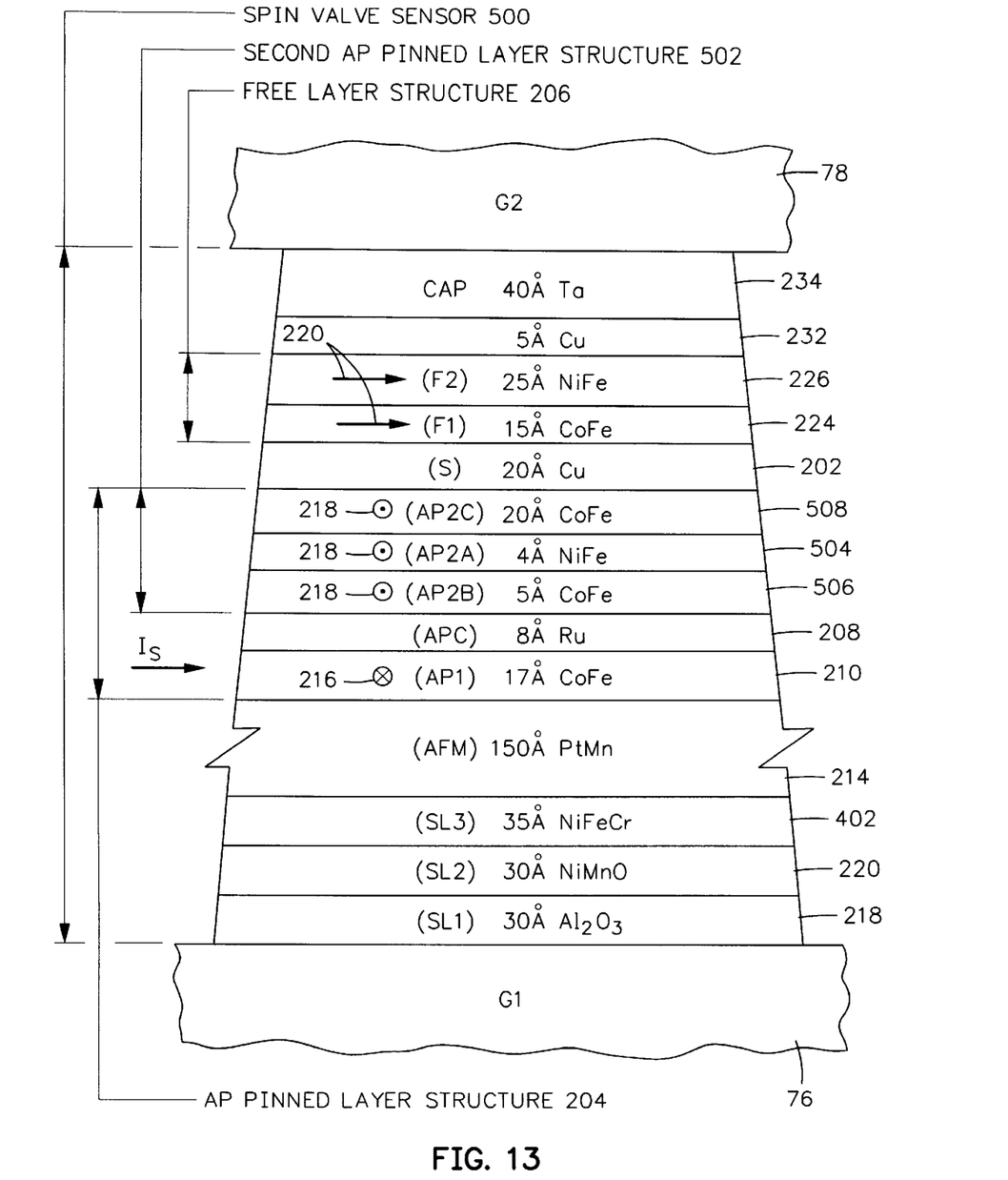
FIG. 13 is an ABS illustration of a second embodiment of the present invention.

The spin valve sensor 500 in FIG. 13 is the same as the spin valve sensor 400 in FIG. 12 except the spin valve sensor 500 has a second AP pinned layer 502 which includes first, second and third pinned films (AP2A), (AP2B) and (AP2C) 504, 506 and 508 with the first pinned film 504 being located between the second and third films 506 and 508. The third film 508 interfaces the copper spacer layer 202. The thicknesses and materials of the layers are 5 Å of cobalt iron for the second pinned film 506, 4 Å of nickel iron for the first pinned film 504 and 20 Å of cobalt iron for the third pinned film 508. The magnetostriction was $-5.8 \times 10^{-7}$. The resistance R of the sensor was 22.8 ohms, the magnetoresistive coefficient dr/R was 8.63%, the easy axis coercivity ($H_C$) was 5.5 Oe and the ferromagnetic coupling field ($H_F$) was 6 Oe.

Discussion

In all embodiments the composition of the cobalt iron was $Co_{90}Fe_{10}$ and the composition of the nickel iron was $Ni_{83}Fe_{17}$. The nickel iron layers in the sensors were fabricated without changing a nickel iron target in the sputtering chamber and the cobalt iron layers were made without changing a cobalt iron target within the sputtering chamber. For instance, without changing a particular target composition, such as $Co_{90}Fe_{10}$, in a sputtering chamber each of the cobalt iron layers in the AP pinned layer structure 204 and the cobalt iron layer 224 in the free layer structure 206 in FIG. 11 can be fabricated with an acceptable magnetostriction for the free layer structure 206. In the past the composition of the cobalt iron target would have to be changed in order to fabricate the cobalt iron layer of the free layer structure with an acceptable magnetostriction in a bottom spin valve sensor. It should be understood that the cobalt iron layers may be cobalt based without departing from the spirit of the invention. The pinning layer was platinum manganese ($Pt_{50}Mn_{50}$).

It should be noted from the examples that by locating a thin nickel iron pinned film between first and second pinned films of cobalt iron the magnetostriction can be significantly decreased to zero or slightly negative. While the AP pinned layer structure is preferred, it should be understood that the invention can be practiced with a single pinned layer having the multiple pinned films according to the present invention without departing from the spirit of the invention. Further, the spin valve sensor can be a dual spin valve sensor instead of a single spin valve sensor, as shown in the figures without departing from the spirit of the invention.

The invention is preferably practiced with the first pinned film being nickel iron ($Ni_{83}Fe_{17}$) and the second and third pinned films being cobalt iron ($Co_{90}Fe_{10}$). Further, the third pinned film, which interfaces the spacer layer, is preferably thicker than each of the other first and second pinned films with a preferred thickness from 4 Å to 8 Å.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
    a spin valve sensor including:
        a pinned layer structure that has a magnetic moment;
        a pinning layer exchange coupled to the pinned layer structure for pinning the magnetic moment of the pinned layer structure;
        a ferromagnetic free layer structure; and
        a nonmagnetic electrically conductive spacer layer located between the free layer structure and the pinned layer structure;
    the pinned layer structure including:
        ferromagnetic first, second and third pinned films with the first pinned film located between and interfacing the second and third pinned films; and
        the second and third pinned films being composed of a cobalt based material and the first pinned film being composed of nickel iron.

2. A magnetic read head as claimed in claim 1 including:
    nonmagnetic electrically nonconductive first and second read gap layers;
    the spin valve sensor being located between the first and second read gap layers;
    ferromagnetic first and second shield layers; and
    the first and second read gap layers being located between the first and second shield layers.

3. A magnetic read head as claimed in claim 2 wherein the third pinned film interfaces the spacer layer and is thicker than each of the first and second pinned films.

4. A magnetic read head as claimed in claim 2 wherein the pinned layer structure is an antiparallel (AP) pinned layer structure that includes:
    ferromagnetic first and second antiparallel (AP) pinned layers with the first AP pinned layer interfacing the pinning layer and the second AP pinned layer interfacing the spacer layer;
    an antiparallel (AP) coupling layer located between and interfacing the first and second AP pinned layers; and
    the second AP pinned layers comprising said first, second and third pinned films.

5. A magnetic read head as claimed in claim 4 wherein the third pinned film interfaces the spacer layer and is thicker than each of the first and second pinned films.

6. A magnetic read head as claimed in claim 5 wherein the second and third pinned films are composed of cobalt iron.

7. A magnetic read head as claimed in claim 6 wherein the thickness of the first pinned film is from 4 Å to 8 Å.

8. A magnetic read head as claimed in claim 7 wherein the second and third pinned films are composed of cobalt iron ($Co_{90}Fe_{10}$) and the first pinned film is composed of nickel iron ($Ni_{83}Fe_{17}$).

9. A magnetic head assembly having an air bearing surface (ABS), comprising:
    a write head including:
        ferromagnetic first and second pole piece layers that have a yoke portion located between a pole tip portion and a back gap portion;
        a nonmagnetic write gap layer located between the pole tip portions of the first and second pole piece layers;
        an insulation stack with at least one coil layer embedded therein located between the yoke portions of the first and second pole piece layers; and
        the first and second pole piece layers being connected at their back gap portions; and
    a read head including:
        a spin valve sensor;
        nonmagnetic electrically nonconductive first and second read gap layers;
        the spin valve sensor being located between the first and second read gap layers;
        a ferromagnetic first shield layer; and
        the first and second gap layers being located between the first shield layer and the first pole piece layer; and
    the spin valve sensor including:
        a pinned layer structure that has a magnetic moment;
        a pinning layer exchange coupled to the pinned layer structure for pinning the magnetic moment of the pinned layer structure;
        a ferromagnetic free layer structure; and
        a nonmagnetic electrically conductive spacer layer located between the free layer structure and the pinned layer structure;
    the pinned layer structure including:
        ferromagnetic first, second and third pinned films with the first pinned film located between and interfacing the second and third pinned films; and
        the second and third pinned films being composed of a cobalt based material and the first pinned film being composed of nickel iron.

10. A magnetic head assembly as claimed in claim 9 wherein the pinned layer structure is an antiparallel (AP) pinned layer structure that includes:
    ferromagnetic first and second antiparallel (AP) pinned layers with the first AP pinned layer interfacing the pinning layer and the second AP pinned layer interfacing the spacer layer;
    an antiparallel (AP) coupling layer located between and interfacing the first and second AP pinned layers; and
    the second AP pinned layers comprising said first, second and third pinned films.

11. A magnetic head assembly as claimed in claim 10 wherein the third pinned film interfaces the spacer layer and is thicker than each of the first and second pinned films.

12. A magnetic head assembly as claimed in claim 11 wherein the second and third pinned films are composed of cobalt iron.

13. A magnetic head assembly as claimed in claim 12 wherein the thickness of the first pinned film is from 4 Å to 8 Å.

14. A magnetic head assembly as claimed in claim 13 wherein the second and third pinned films are composed of cobalt iron ($Co_{90}Fe_{10}$) and the first pinned film is composed of nickel iron ($Ni_{83}Fe_{17}$).

15. A magnetic disk drive including at least one magnetic head assembly that has an air bearing surface (ABS) and that includes a write head and a read head, comprising:

the write head including:
  ferromagnetic first and second pole piece layers that have a yoke portion located between a pole tip portion and a back gap portion;
  a nonmagnetic write gap layer located between the pole tip portions of the first and second pole piece layers;
  an insulation stack with at least one coil layer embedded therein located between the yoke portions of the first and second pole piece layers; and
  the first and second pole piece layers being connected at their back gap portions; and the read head including:
  a spin valve sensor;
  nonmagnetic electrically nonconductive first and second read gap layers;
  the spin valve sensor being located between the first and second read gap layers;
  a ferromagnetic first shield layer; and
  the first and second read gap layers being located between the first shield layer and the first pole piece layer; and the spin valve sensor including:
  a pinned layer structure that has a magnetic moment;
  a pinning layer exchange coupled to the pinned layer structure for pinning the magnetic moment of the pinned layer structure;
  a ferromagnetic free layer structure; and
  a nonmagnetic electrically conductive spacer layer located between the free layer structure and the pinned layer structure;

the pinned layer structure including:
  ferromagnetic first, second and third pinned films with the first pinned film located between and interfacing the second and third pinned films; and
  the second and third pinned films being composed of a cobalt based material and the first pinned film being composed of nickel iron;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

16. A magnetic disk drive as claimed in claim 15 wherein the pinned layer structure is an antiparallel (AP) pinned layer structure that includes:
  ferromagnetic first and second antiparallel (AP) pinned layers with the first AP pinned layer interfacing the pinning layer and the second AP pinned layer interfacing the spacer layer;
  an antiparallel (AP) coupling layer located between and interfacing the first and second AP pinned layers; and
  the second AP pinned layers comprising said first, second and third pinned films.

17. A magnetic disk drive as claimed in claim 16 wherein the third pinned film interfaces the spacer layer and is thicker than each of the first and second pinned films.

18. A magnetic disk drive as claimed in claim 17 wherein the second and third pinned films are composed of cobalt iron.

19. A magnetic disk drive as claimed in claim 18 wherein the thickness of the first pinned film is from 4 Å to 8 Å.

20. A magnetic disk drive as claimed in claim 19 wherein the second and third pinned films are composed of cobalt iron ($Co_{90}Fe_{10}$) and the first pinned film is composed of nickel iron ($Ni_{83}Fe_{17}$).

21. A method of making a magnetic read head which has an air bearing surface (ABS), comprising the steps of:
  making a spin valve sensor comprising the steps of:
    forming a pinned layer structure that has a magnetic moment;
    forming a pinning layer exchange coupled to the pinned layer structure for pinning the magnetic moment of the pinned layer structure;
    forming a ferromagnetic free layer structure; and
    forming a nonmagnetic electrically conductive spacer layer between the free layer structure and the pinned layer structure;
  the forming of the pinned layer structure including the steps of:
    forming ferromagnetic first, second and third pinned films with the first pinned film located between and interfacing the second and third pinned films; and
    forming the second and third pinned films of a cobalt based material and the first pinned film of nickel iron.

22. A method as claimed in claim 21 including:
  forming nonmagnetic electrically nonconductive first and second read gap layers;
  forming the spin valve sensor between the first and second read gap layers;
  forming ferromagnetic first and second shield layers; and
  forming the first and second read gap layers between the first and second shield layers.

23. A method as claimed in claim 22 wherein the third pinned film is formed to interface the spacer layer with a thickness that is greater than each of the first and second pinned films.

24. A method as claimed in claim 22 wherein a forming of the pinned layer structure comprises the steps of:
  forming ferromagnetic first and second antiparallel (AP) pinned layers with the first AP layer interfacing the pinning layer; and
  forming an antiparallel (AP) coupling layer between and interfacing each of the first and second AP pinned layers; and
  the second AP pinned layer being formed to comprise said first, second and third pinned films.

25. A method as claimed in claim 24 wherein the third pinned film is formed to interface the spacer layer with a thickness that is greater than each of the first and second pinned films.

26. A method as claimed in claim 25 wherein the second and third pinned films are formed of cobalt iron.

27. A method as claimed in claim 26 wherein the first pinned film is formed with a thickness from 4 Å to 8 Å.

28. A method as claimed in claim 27 wherein the second and third pinned films are formed of cobalt iron ($Co_{90}Fe_{10}$) and the first pinned film is formed of nickel iron ($Ni_{83}Fe_{17}$).

29. A method of making magnetic head assembly that has an air bearing surface (ABS), comprising the steps of:

making a write head including the steps of:
forming ferromagnetic first and second pole piece layers in pole tip, yoke and back gap regions wherein the yoke region is located between the pole tip and back gap regions;
forming a nonmagnetic electrically nonconductive write gap layer between the first and second pole piece layers in the pole tip region;
forming an insulation stack with at least one coil layer embedded therein between the first and second pole piece layers in the yoke region; and
connecting the first and pole piece layers at said back gap region; and making a read head including the steps of:
forming nonmagnetic electrically nonconductive first and second read gap layers;
forming a spin valve sensor between the first and second read gap layers;
forming the first and second read gap layers between the first shield layer and the first pole piece layer; and
a making of the spin valve sensor comprising the steps of:
forming a pinned layer structure that has a magnetic moment;
forming a pinning layer exchange coupled to the pinned layer structure for pinning the magnetic moment of the pinned layer structure;
forming a ferromagnetic free layer structure; and
forming a nonmagnetic electrically conductive spacer layer between the free layer structure and the pinned layer structure;
the forming of the pinned layer structure including the steps of:
forming ferromagnetic first, second and third pinned films with the first pinned film located between and interfacing the second and third pinned films; and
forming the second and third pinned films of a cobalt based material and the first pinned film of nickel iron.

30. A method as claimed in claim 29 wherein a forming of the pinned layer structure comprises the steps of:
forming ferromagnetic first and second antiparallel (AP) pinned layers with the first AP layer interfacing the pinning layer; and
forming an antiparallel (AP) coupling layer between and interfacing each of the first and second AP pinned layers; and
the second AP pinned layer being formed to comprise said first, second and third pinned films.

31. A method as claimed in claim 30 wherein the third pinned film is formed to interface the spacer layer with a thickness that is greater than each of the first and second pinned films.

32. A method as claimed in claim 31 wherein the second and third pinned films are formed of cobalt iron.

33. A method as claimed in claim 32 wherein the first pinned film is formed with a thickness from 4 Å to 8 Å.

34. A method as claimed in claim 33 wherein the second and third pinned films are formed of cobalt iron ($Co_{90}Fe_{10}$) and the first pinned film is formed of nickel iron ($Ni_{83}Fe_{17}$).

* * * * *